United States Patent
Merritt

(10) Patent No.: US 6,918,202 B2
(45) Date of Patent: Jul. 19, 2005

(54) FLY CASTING TRAINING DEVICE

(76) Inventor: Harry C. Merritt, P.O. Box 212, Beals, ME (US) 04611

( * ) Notice: Subject to any disclaimer, the term of this patent is extended or adjusted under 35 U.S.C. 154(b) by 59 days.

(21) Appl. No.: 09/833,519

(22) Filed: Apr. 12, 2001

(65) Prior Publication Data

US 2002/0148154 A1 Oct. 17, 2002

(51) Int. Cl.$^7$ ................................................ A01K 97/00
(52) U.S. Cl. .................................. 43/4.5; 43/4
(58) Field of Search ........................... 43/4, 4.5, 24, 25

(56) References Cited

U.S. PATENT DOCUMENTS

| | | | |
|---|---|---|---|
| 1,168,808 A | | 1/1916 | Von Hoffmann |
| 2,180,781 A | * | 11/1939 | Taylor ............................. 43/24 |
| 2,705,148 A | | 3/1955 | Waller ......................... 273/106 |
| 2,709,315 A | * | 5/1955 | Walter ............................. 43/24 |
| 2,781,602 A | * | 2/1957 | Warford ........................ 43/24 |
| 2,792,660 A | * | 5/1957 | Jennette .......................... 43/24 |
| 2,893,158 A | * | 7/1959 | Haber ............................. 43/24 |
| 2,902,023 A | | 9/1959 | Waller .......................... 124/5 |
| 3,305,963 A | * | 2/1967 | Minera ......................... 43/18.1 |
| 3,325,938 A | * | 6/1967 | Minera ........................ 43/18.1 |
| 3,432,958 A | * | 3/1969 | Bellinger ........................ 43/24 |
| 3,791,063 A | * | 2/1974 | Harker .......................... 43/4.5 |
| 3,797,472 A | | 3/1974 | Knisely, Jr. ..................... 124/5 |
| 3,841,292 A | | 10/1974 | Hoffman ......................... 124/5 |
| 3,897,068 A | | 7/1975 | Staples .................... 273/186 A |
| 4,364,371 A | | 12/1982 | Woolard ......................... 124/5 |
| 4,598,911 A | | 7/1986 | Lepera .................... 273/186 A |
| 4,794,905 A | | 1/1989 | Woolard ......................... 124/5 |
| 5,129,650 A | | 7/1992 | Hayman .................... 273/77 A |
| 5,241,773 A | * | 9/1993 | Burgh ......................... 43/18.1 |
| 5,297,355 A | | 3/1994 | O'Brien ........................... 43/4 |
| 5,467,740 A | * | 11/1995 | Redwine ...................... 119/707 |
| 5,678,351 A | | 10/1997 | Halterman, Jr. .............. 43/43.1 |

* cited by examiner

*Primary Examiner*—Kurt Rowan
(74) *Attorney, Agent, or Firm*—Michael E. Mauney

(57) ABSTRACT

A fly casting training device to attach to the end of a fly rod and to teach the proper acceleration and deceleration movement required to produce a "tight loop" fly cast. A fly cast training device is attached to the end of a fly rod and secures a throwing projectile in place. When a proper casting motion is made by the user, which involves a sudden acceleration and deceleration, the throwing projectile is thrown off the end of the rod approximately parallel to the ground. The throwing projectile can be designed to approximate the characteristics of a particular type of fly line and to carry about the same distance as a cast made with that type of fly line. If an improper motion is made, the throwing projectile either is thrown toward the ground at a steep angle or is thrown upward at a steep angle. A user practicing with the fly cast training device receives immediate feedback telling the user if either the proper or improper casting motion has been made, hence can teach the proper casting motion.

20 Claims, 4 Drawing Sheets

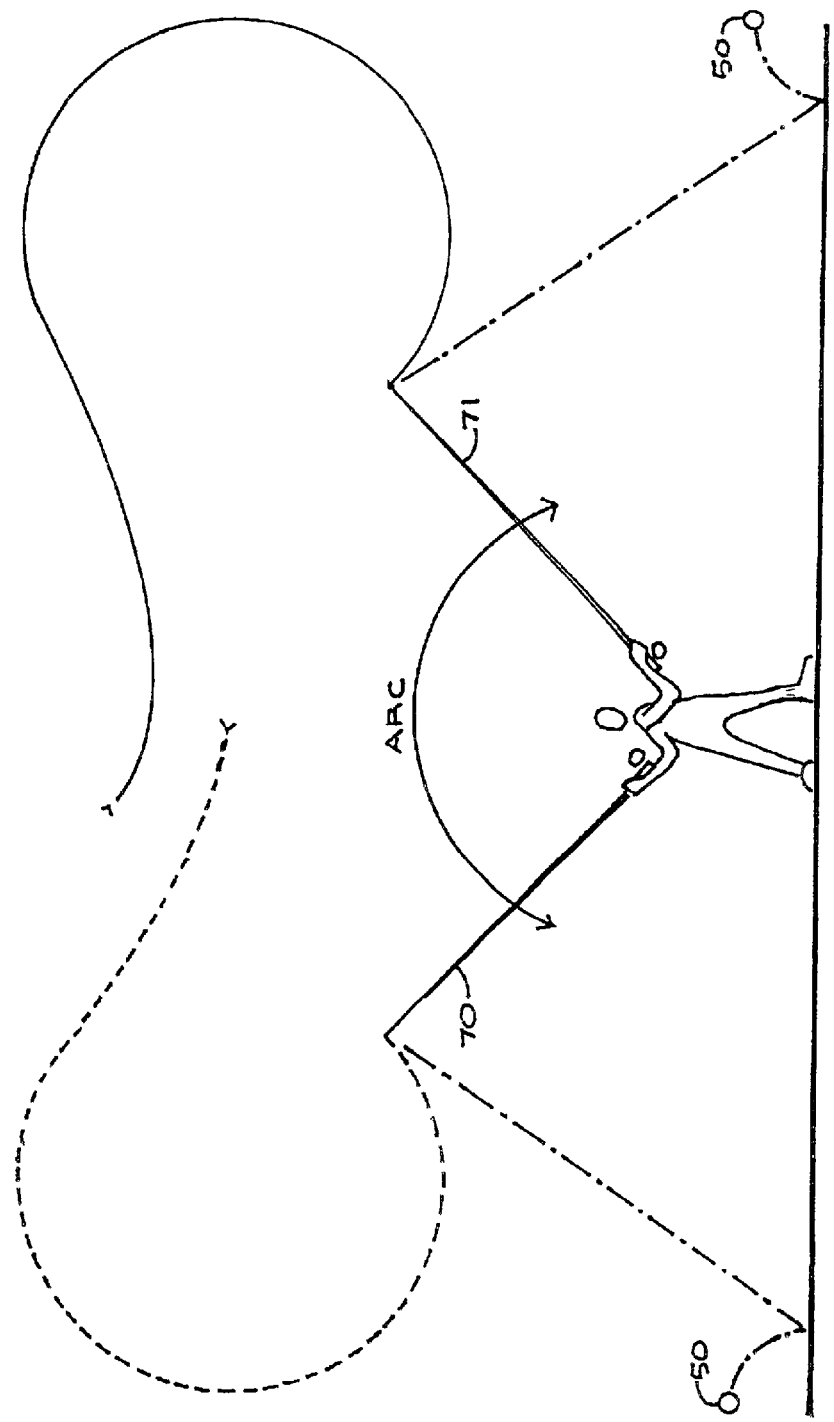

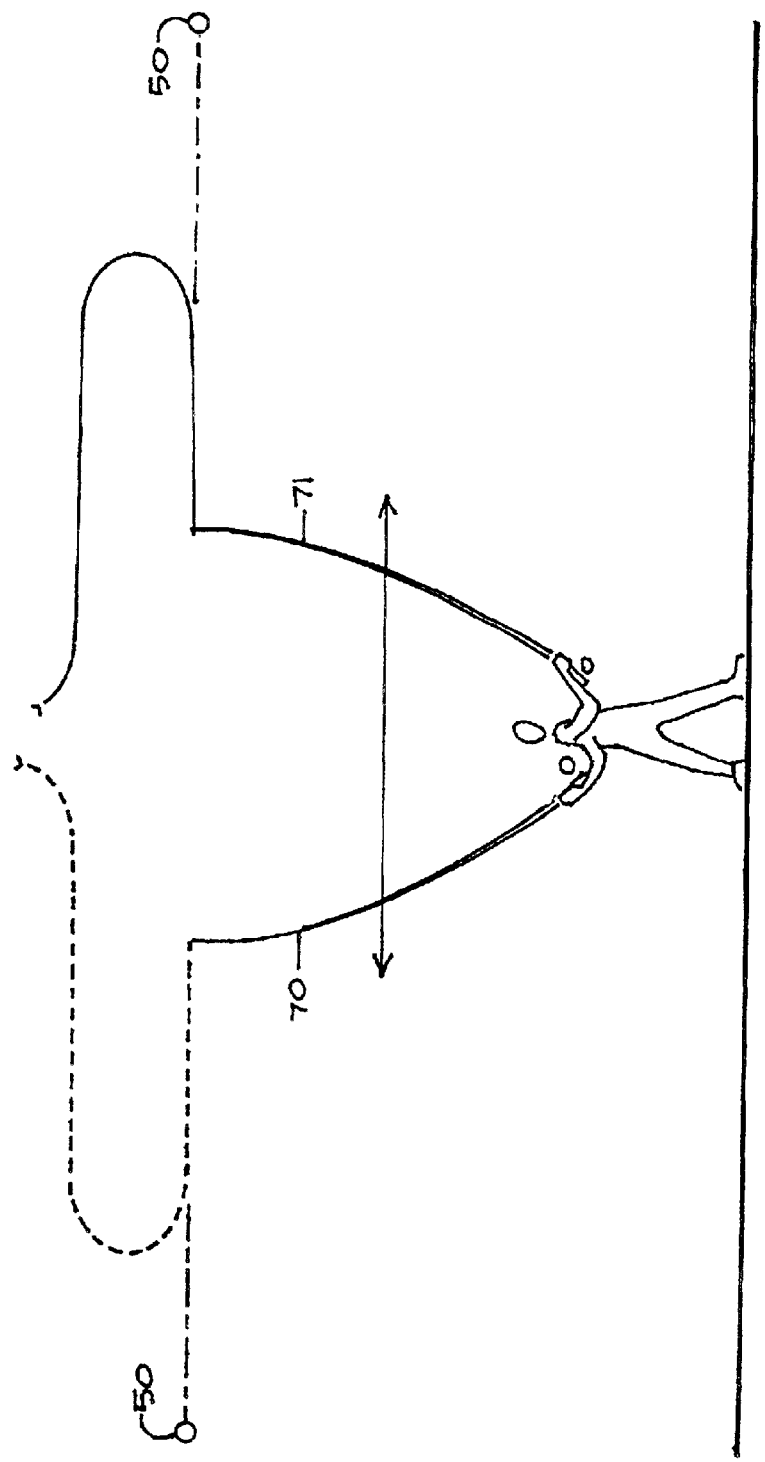

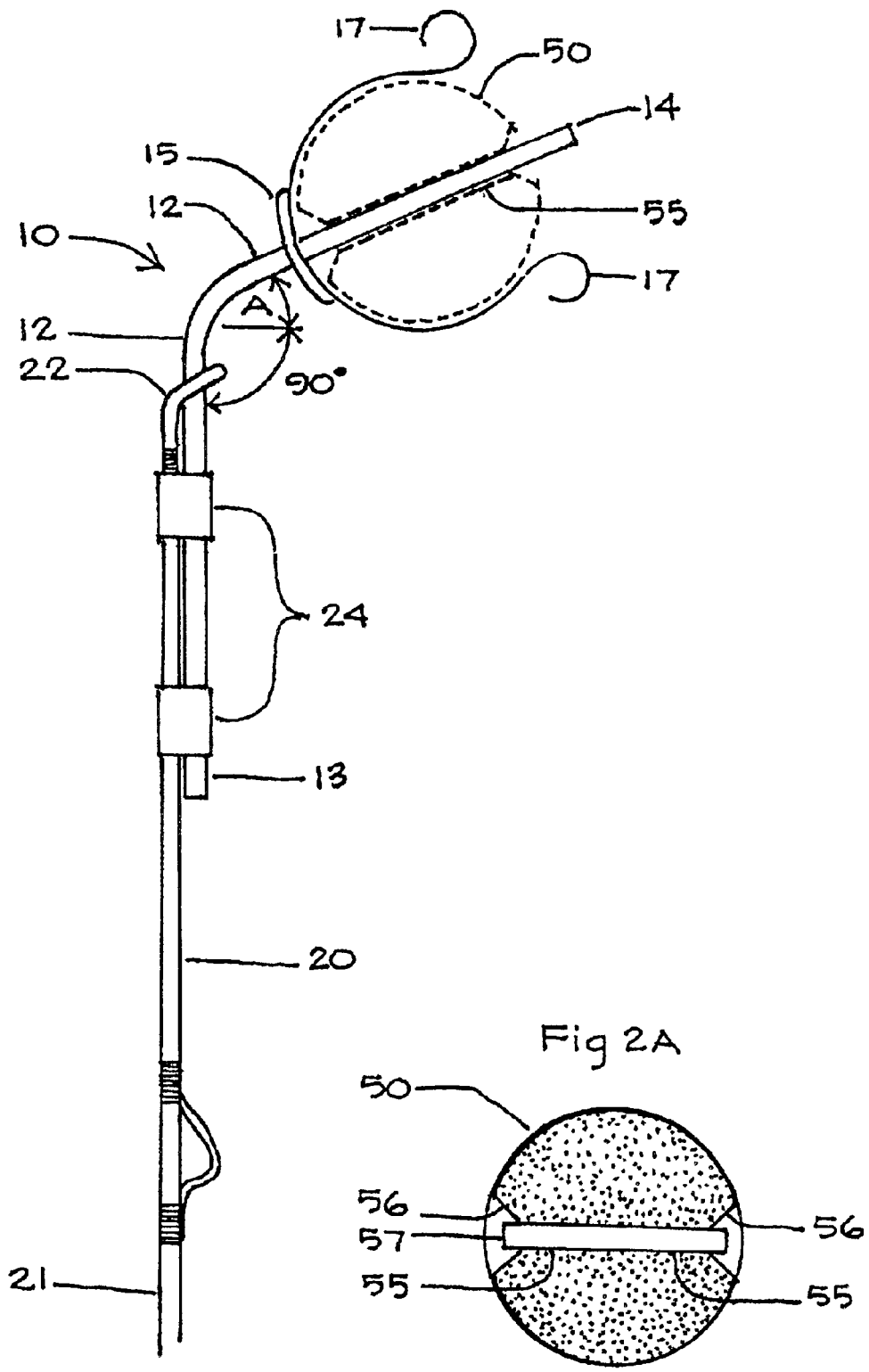

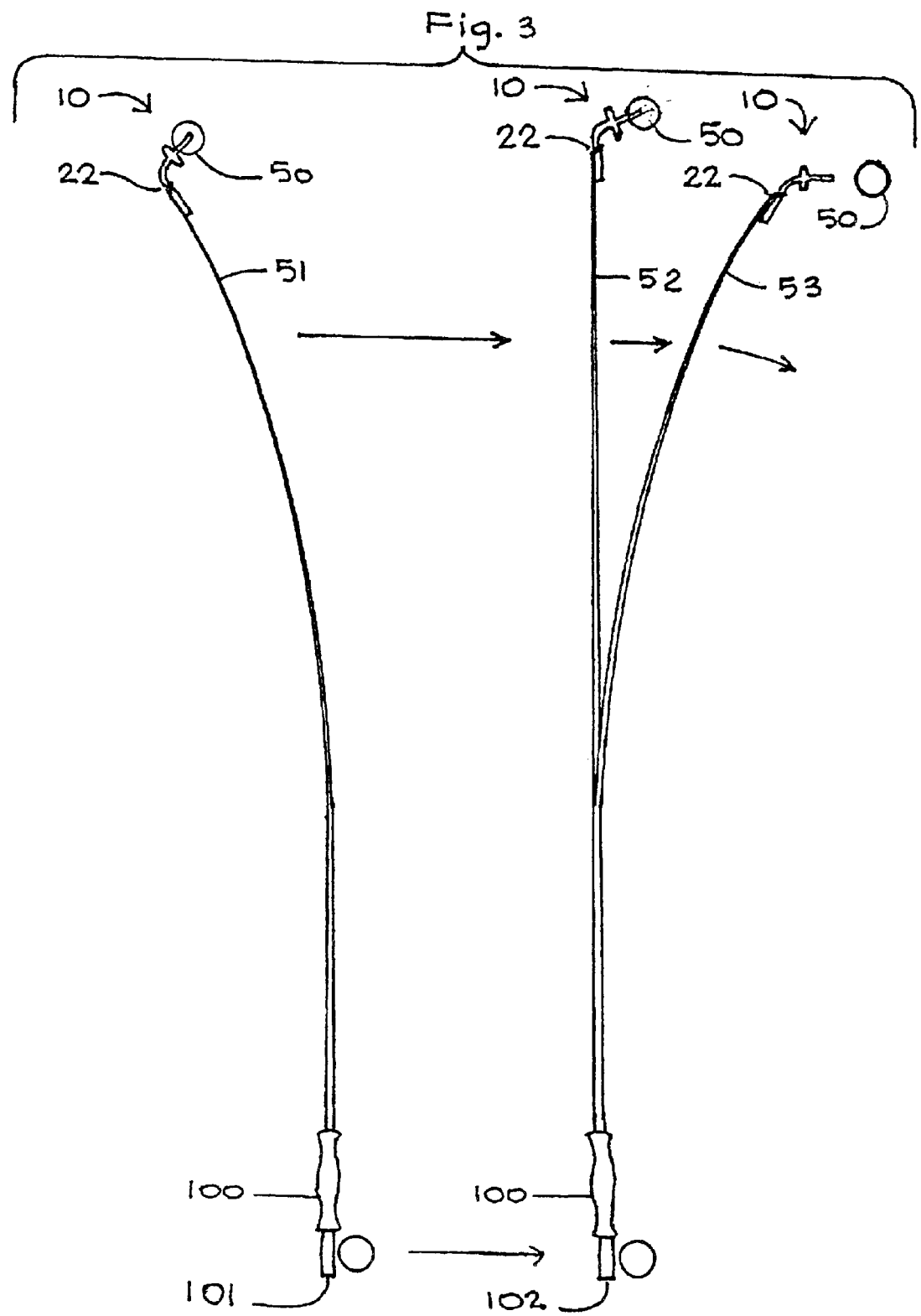

FLY CASTING TRAINING DEVICE

FIELD OF THE INVENTION

This invention relates to a small add-on device to be used with a fly rod or a portion of a fly rod to teach a beginner the proper motion to make an effective fly cast. Also, it can be used for practice by more advanced fly fishermen when changing to a different type rod and line that might require a somewhat different casting motion.

BACKGROUND AND DESCRIPTION OF RELATED ART

For most people, the sport of fishing uses a line, a rod, and a lure or bait with a hook embedded in the lure or bait. The line is usually attached to the rod. The bait is allowed to fall onto or into the water where fish are believed to be waiting in hopes that a fish will mistake the bait or lure for food, bite it, and be snagged by the hook embedded in the bait. The line may be then used to pull the fish from the water and the process repeated.

For some people, fishing still consists largely of that basic activity with a cane pole, a line, a float, a hook, and a store of earth worms to be used for bait. However, at an extreme end, deep sea sport fishermen have a 60 or 70 foot ocean-going boat, sometimes costing over $10 million, with complicated electronics, radar, sonar, GPS systems, outriggers, and with rod-and-reel and line combinations that retail for well over a thousand dollars each. Fly fishing is one fishing method, albeit one of the most difficult to master. Fly fishing is probably the oldest form of sport fishing dating back to the third century C.E. Bait casting and spin casting are more recent forms of sport fishing being respectively around 150 years old and 75 years old.

In conventional spinning rods and reels and bait casting rods and reels, the weight of the lure is used, along with the rod, to throw the lure into an area where the fish is believed to be. Throwing the lure is not unlike throwing any other object, like a baseball or a rock, but the motion is aided by a rod to extend the arc of the throwing motion. In fly fishing, one uses a relatively long, flexible rod, and relatively heavy line that is stored on a reel. At one end of that line a lighter line or leader is tied to the heavy line. The light line or leader terminates in a very lightweight, usually artificial, fly which is designed to look like some fly or prey found in nature which forms part of the food of a particular sport fish or predator, like rainbow trout or salmon. The bait or fly is presented by using a relatively heavy line. It is the line that is cast or thrown and the lightweight fly at the end of the line moves only because the line itself moves. In short, in bait or spin casting the lure is thrown and the line goes along for the ride, while in fly casting the line is thrown and the lure goes along for the ride.

Ordinarily, fly casting requires longer rods for most efficiency. While casting, the fly reel serves only as a line storage device. The fisherman, in using a fly rod and reel, pulls the fly line from the reel as the cast is being made. A cast is made by executing the rod to move the entire length of line to be cast in the air forwards and backwards, usually, sometimes adding line in each repetition until an appropriate length of line is in play, then using the rod to deliver the line and the terminal fly to the water. A very experienced and skillful fisherman using a bait or spin casting reel, especially ones designed for surf fishing, can cast a several-ounce lure hundreds of feet with accuracy. However, in fly fishing most casts are between 20 and 60 feet with casts over 100 feet rare and requiring good equipment and extraordinary skill.

Because of these and other differences, fly fishing has largely diverged from spin or bait casting. First, one can learn to cast using a spinning or bait casting equipment very quickly. Even a child can be taught in a few minutes to use the equipment well enough to be able to fish with it. Equipment can be bought at a variety store for spinning or bait casting for as little as $20 and rarely is it necessary to spend over $200 to obtain a good rod-and-reel combination. For these reasons, it may be thought that bait and spin casting is a relative utilitarian sport with the goal of catching fish being primary in the minds of most fishermen.

On the other hand, fly fishing has developed to focus more on the sport of the process and less on the outcome. First, it is far more difficult to learn to cast a fly line than it is to use a spinning reel and rod. Second, the equipment ordinarily is substantially more expensive. As in any sport, there is inexpensive equipment, but even an adequate fly rod usually costs several hundred dollars. When one adds the other equipment that is ordinarily used, including reels and lines, it is difficult to obtain an adequate amount of equipment for moderate success at fly fishing for much less than $1000. Producing appropriately tied flies to be used with fly casting is virtually an art in itself with many of the flies being not only useable to catch fish, but valuable as works of craftsmanship in themselves. The divergence between these two types of sport fishing has resulted in fly fishing being much more oriented toward the process of presenting the fly appropriately than the outcome of catching fish for the table.

Part of the reason for the divergence in the two disciplines is that the very skills that make one good at casting a lure using a spinning rod or a bait casting rod do not help one cast a fly using fly fishing equipment. Indeed, the very motions that are required for one are counterproductive in the other. Therefore, an experienced spin casting or bait casting fisherman who wants to learn to fly fish must first forget, or at least ignore, the skills that he or she has developed for spin or bait casting. Consequently, teaching an angler to learn to fly fish is a difficult and demanding task. Throwing a lure attached to a spinning or bait casting rod-and-reel is not all that unlike just throwing the lure. One only need to learn to use the rod for the extra arc of motion and energy that it gives and to learn to release the line so that it will freely flow off the reel as the lure is thrown. On the other hand, a fly cast is far more complicated and far less intuitive. What is being thrown is not the lightweight fly at the end of the line, but the line itself. The rod is usually longer and more flexible than a bait casting or spin casting rod. To some degree, the weight of the line is used to throw the line but, perhaps more importantly, the loading and unloading of the rod is used to impart a wave motion to the line. The wave motion in the line greatly increases the efficiency of this fly cast and makes it possible to cast the still relatively lightweight line, albeit heavier than spinning or bait casting line, a substantial distance with great accuracy.

A difficulty in teaching fly fishing is the space required to practice. If one wishes to make a 50-foot cast, then one needs close to 50 feet of clear space behind one because the line extends behind as part of the cast and then 50 clear feet in front of one for the cast to take place. Moreover, because the fly casting line is relatively expensive and can be easily abraded by rough surfaces, one should not do it in a paved or gravel parking lot. Ideally, one would have this amount of open water available or, at least one would need a grassy area of this size. In urban areas there are very few open grassy spaces of a hundred feet in size that are readily available that are not already being used by children for play or by older children or adults for sports. Fly casting practice and soccer practice cannot coexist on the same field. Consequently, urban dwellers who wish to practice their fly casting are frequently relegated to doing so at unusual hours or in unusual places.

There are devices proposed to provide a target plate for someone practicing fly casting for accuracy. For example, O'Brien U.S. Pat. No. 5,297,355 uses a target with a steel leader to complete an electrical connection to give an indication when the target is hit, as well as to keep a record of hits over a given time period. Halterman, U.S. Pat. No. 5,678,351 proposes a device to be used with a spin or bait casting equipment which enables the angler to cast a lure or fly ordinarily only castable with fly casting equipment. Various types of throwing rods with an attached object or ball at the end are used for games. These devices are not unlike a casting rod but with a lure unconnected to any line. An example of these can be seen in Hayman, U.S. Pat. No. 5,129,650, Woolard, U.S. Pat. Nos. 4,794,905, and 4,364,371. A variation of this rod-and-ball construction can be used as a golf swing training device where a shaft has a grip at one end with a weight member at the other end with a user gripping the grip and swinging the shaft like a golf club (see Staples, U.S. Pat. No. 3,897,068). However, none of these devices in any way can be used or adopted to be used to teach the appropriate motion required for a successful presentation of a line in a fly cast.

Consequently, it would be an advance in the art to have a device that could be readily attached to a fly rod. The device should give immediate feedback when an appropriate motion is made by the one using the fly rod so that an appropriate casting motion by the user will result in a particular outcome while an inappropriate motion will result in a completely different outcome. The device should be simple, easily constructed, inexpensive, and fit onto an existing fly rod that the user already has. It is an advantage if the device could be used with only a portion of the fly rod so that one could even practice the motion with a portion of the fly rod usually four to five feet in length, in an enclosed indoor space, such as a den or even an office at lunch time.

SUMMARY OF THE CURRENT INVENTION

In most sports there is a basic motion that must be mastered. Once a participant has mastered this basic motion (i.e., has learned to walk), then the participant may begin to learn variations or advanced motions for specific situations (i.e., learns to dance or run). For example, in golf there is the basic full swing but then there are many variations of this swing which are used for special shots where one may desire to curve the ball or have it fly higher or lower and so on. This is also true for fly casting. Sometimes one may be required to cast side arm to avoid interference from trees or overhanging branches or one may wish to have the line and fly pile up in a particular place to be carried by the water to a place where a fish is believed to be waiting. However, in fly fishing the basic motion is to cast the line back and forth in a straight line, sometimes adding amounts of line with a casting motion until the appropriate length of line is in play, then completing the cast by allowing the line to fall to the water. An experienced, able fly fisherman can put 50 or 60 feet of the line in play and then place the fly accurately in a few square inches. This basic straight line casting motion is one that first must be mastered and is very counter intuitive to bait or spin casting motions. An angler who attempts to "throw" the fly as he or she might throw a lure using a spinning or bait casting line will have no success. The line will simply fall in a pile a few feet from the end of the rod. One must learn the appropriate motions of the body, hence the rod, so that the tip of the rod moves through a very small arc at the appropriate time. This causes the line to go backward and forward in a "tight loop" configuration. Indeed, the term "tight loop" or "tight loops" is a generic description for a good cast using fly fishing equipment.

The casting of the line correctly is a "feel" or right brain activity. But most of the teaching, both verbal and visual, is a left brain activity. It is difficult, if not impossible, to reason one's way to a good fly casting technique. One common method of teaching occurs when a teacher stands with a student and the student allows the teacher to grip the student's wrist and the teacher performs the motion required for an effective cast, gripping the student's hand on the rod, rather than directly gripping the rod. However, many students who think they have learned the "feel" of a fly cast when an instructor is standing with him actually making the motion soon realizes that this was a false impression as he sees his line fall in a forlorn pile only a few feet in front of the end of his rod when he attempts to make a cast on his own. When the instructor has moved on to another student in a class, the student learns that the skill that he thought he had acquired was actually the instructor's skill.

Consequently, it would be an advance in the art to give a device which would respond one way when an appropriate motion is made to create a "tight loop" fly cast and an entirely different way when an inappropriate motion is made. While a fly line can be used to give this feedback, there are several problems. First, it is hard to practice by oneself in one's home or in a reasonable amount of space. Secondly, one may make two or three correct motions using a fly rod but, before the cast is actually made, a few inappropriate motions will spoil the cast. Thus, the immediate and direct feedback effect that would be desirable is reduced because, in the series of casting motions, there are the good motions and there are bad motions, and a beginner has difficulty telling them apart. Therefore, it would be helpful to have a device that will give an appropriate feedback for the critical part of each individual casting motion. Thus, no series of correct motions are required to get a correct cast, but rather one can make a single motion and know whether it was correct or not, repeat the motion and know whether it was correct or not, and so on, to where one can quickly groove the feeling of a single correct motion. Once the feeling is grooved using the teaching device, one can then move to a practice session using a real line but now with an understanding and feel for the correct motion.

The current invention consists of a small, malleable tube called a throwing tube. The tube is sized to fit through the tip guide on the end of a fly rod. The throwing tube will be a few inches long, usually around 5 inches. At the approximate midway point in the throwing tube, it will have a bend at a predetermined angle. Ordinarily, this angle is greater than 90°. After the point of the angle, a "stop" is placed on the throwing tube. It could be a disk placed around the throwing tube forming a collar. One end of the throwing tube is placed through the tip guide or eyelet at the end of the fly rod with the throwing tube taped or otherwise attached to the fly rod tip. A lightweight throwing projectile with a bore slightly larger than the diameter of the throwing tube is placed over the end of the tip of the throwing tube, then slid downward to the collar or "stop". An appropriate casting moment will cause the projectile to be thrown off the throwing tube and forward a considerable distance. If, on the other hand, the user makes an incorrect motion with the fly rod, the projectile will fly off the throwing tube and hit the ground immediately in front of the user or fly upward and fall to the ground a short distance from the user.

The predetermined angle on the throwing tube is varied depending on the type of fly fishing rod for which practice is sought. Fly fishing rods have different flexibilities, depending on the type of fishing for which the rod is used. Different flexibilities in the fly rod require a slightly different angle on the throwing tube.

In use, the throwing tube is taped to the fly rod, the projectile is placed on the end of the rod, and a casting motion is made. If a good result is obtained, another projectile is placed on the tube and the motion repeated. The user may have a hand full or pocket full of these projectiles, much as a golfer may practice his swing using a bucket of balls at a practice range, so that a number of motions can be made before it is necessary to collect the projectiles to start again. Once a user has learned to bring the fly fishing rod forward in a way that causes the projectile to fly forward a considerable distance, then the correct action is, to some degree, ingrained in the user and he is ready to begin practice with an actual line.

It is the object of the current invention to readily and immediately attach to an existing fly rod. It is a further object of the current invention to enable a user of the fly rod to receive an immediate feedback when making a fly casting motion to know if the fly casting motion would have resulted in an effective cast of the fly line had the fly line been attached to the rod at the time the motion was made. It is a further object of the current invention to readily adapt for use with fly rods having different characteristics so that different types of fly casts may be simulated using the current invention. It is the object of the current invention to be simply and easily constructed of readily available materials. These and other objects and advantages of the present invention along with features of the novelty that arise from the current invention will appear or become apparent in the course of the Detailed Description of the Drawings which follows.

BRIEF DESCRIPTION OF THE DRAWINGS

FIGS. 1A and 1B show a bad and good fly cast.

FIG. 2 shows the current invention attached to a tip of a fly rod.

FIG. 2A shows the throwing projectile in cut-a-way.

FIG. 3 shows the tip action of a fly rod with the current invention attached.

DETAILED DESCRIPTION OF THE DRAWINGS

FIG. 1A shows a rough approximation of a bad cast made with a fly rod. The fly line in a back cast is shown in dotted lines and the fly line in a fore cast is shown in solid lines. If one uses the wrist to simply move the rod from the back cast position (70) to the fore cast position (71) along the arc (labeled with the term "arc"), then a correspondingly large loop is formed in the fly line as is shown by the respective positions of the fly lines both in the back and fore casts. Much of the energy of the cast is dissipated in forming this large loop. The fly line will lose the fight with gravity in the fore cast and instead of extending fully outwardly in a straight line, as is desirable in a good fly cast, will fall in a tangled loop at a distance substantially less than the length of the fly line in play. The throwing projectile (50) may follow the path shown in the dashed lines with the "bad" fore cast or with the "bad" back cast. Therefore, someone wishing to practice casting will know they have made either a bad fore cast or a bad back cast if the path of the throwing projectile (50) follows the dashed line in FIG. 1A.

FIG. 1B shows a good cast with a "tight loop". A good fly cast involves many elements. Good timing is needed to lift the fly line from the water, make a back cast with a smooth acceleration, wait for the fly line to uncoil behind, and make a smooth forward acceleration. However, to form the tight loop and to make an effective cast, a speed-up and stop motion with a locked wrist are necessary. It is the "speed-up" and "stop" motion with a firm wrist that is most difficult to teach and is contraintuitive for most people. Whether throwing a baseball, javelin, swinging a golf club, or casting with a spinning or bait casting rod, or even rolling a bowling ball, a wrist rotation and cocking and uncocking motion is frequently necessary to achieve a powerful result. However, it is this very cocking and uncocking motion of the wrist that causes a bad cast. A good fly cast uses little, if any, wrist motion. Rather, a frozen wrist with a speed-up and stop motion is required. It is toward the teaching of this speed-up and stop motion that the current invention is directed. As in FIG. 1A, the fly line in a back cast is shown in dotted lines and the fly line in a fore cast is shown with the path of the throwing projectile (50) shown in dashed lines. One should note that the fly line depicted by the dotted lines in the back cast (70) or by the solid line in the fore cast (71) has a much "tighter" loop in the line.

FIG. 2 shows the fly casting training device (10) in place at the tip (20) of a fly rod (21). The fly casting device (10) consists of a tube (12) approximately five inches in overall length. The tube (12) is bent an angle of 90°+A° approximately at a mid-point for the tube (12). The tube (12) will have a rod mounting end (13) and a projectile throwing end (14). Mounted at a point on the tube (12) is a stop (15). It will be mounted closer to the projectile throwing end (14) than the rod mounting end (13) in proximity to the point the tube (12) bends at the 90°+A° angle. The fly casting training device (10) is mounted on a fly rod (21) by passing the rod mounting end (13) through the terminal eyelet (22) at the extreme end of the fly casting rod (20). It is then secured to the rod by mounting means (24). This can simply be tape, double C-clips, or any other convenient means. Ordinarily, there will be two points of mounting in order to assure that the fly casting training device (10) stays aligned with and parallel to the fly rod (21). Ordinarily, from the point of the stop (15) to the end of the tube (12) at the projectile throwing end (14) the tube (12) will be cylindrical in cross sectional shape. However, to facilitate mounting on a cylindrical fly rod, the portion of the tube (12), which attaches to the fly rod (21), may well be bent into a concave shape or some other flat shape to more easily tape or attach to the fly rod (21) A throwing projectile (50) shown in dotted lines with a bore (55) therethrough (seen in more detail in FIG. 2A) is used to give feedback during the use of the fly casting training device (10). The throwing projectile (50) need not be circular in design. It could be oblong, box-like, or even an irregular shape. Ordinarily, the throwing projectile (50) will be constructed of a firm, resilient, lightweight, foam-like material. It should be of sufficient density so that a good cast will be successful in throwing it an appreciable distance, but not so heavy as to affect the characteristics of the rod or resulting in a throw of such length that it becomes tedious to retrieve the throwing projectile (50) for reuse. Moreover, if the throwing projectile (50) was made of a hard, dense material such as metal, throwing it could result in some potential injury to surrounding property or people. The bore (55) in the throwing projectile (50) is slightly larger than the diameter of the tube (12).

The speed-up and stop motion necessary to make a good "tight loop" in a fly casting line is not unlike a short punching motion made with a firm wrist. The hand gripping the base of the fly rod moves forward without any wrist motion for a short, quick acceleration forward, then an abrupt stop—much as if one was throwing then pulling a punch. If the rod was inflexible, then the short forward motion would not load the rod or cause any bend in the rod. When one stops the short, quick motion forward, the throwing projectile (50) which is mounted on the tube (12) would slide forward in the direction of the "punch" flying off the projectile throwing end (14) of the tube (12) and being propelled forward at the approximate velocity achieved by the quick-start and stop punching motion of the cast. To hold the throwing projectile (50) in place until the cast is made, two springs (17) hold the throwing projectile (50) on the tube (12). These springs (17) are thin and flexible and are designed to hold the throwing projectile (50) against the force of gravity, but not against the forces generated by the "punch" motion used in a learning cast. Any convenient means could be used to hold the throwing projectile (50) in place against gravity but releasing it against the force generated by a correct casting motion, including magnets or other spring designs.

However, fly rods are not inflexible but, in fact, have a wide variety of flexes. Therefore, it is ordinarily necessary to have some angle (A) which is a deviation of the projectile throwing end (14) of the tube (12) from a perpendicular angle of 90° between the projectile throwing end (14) and the rod mounting end (13), which is attached to and parallel to the fly rod (21). The less flex the rod has, the smaller the angle (A) is. The tube (12) will ordinarily be constructed of some malleable material, such as aluminum or plastic, which will allow some field adjustment of the angle (A) to suit the individual characteristics of the rod. Moreover, it is anticipated the fly casting training device (10) will be sold pre-bent for various stiffness of rods that are commercially sold. Typically, rods are sold as "fast" rods, "medium" rods, and "slow" rods. The fast rods are the stiffest and will require the smallest angle (A). Medium rods will require a slightly larger angle (A) and slow rods will require a still larger angle (A).

FIG. 2A shows the throwing projectile (50) in more detail in a cut-a-way view. A throwing projectile (50) is made of some soft flexible material like foam or other plastic material. The throwing projectile (50) may be made spherical for ease of manufacture. The shape of the throwing projectile (50) is not critical for its primary purpose of giving feedback to a user to tell if a proper casting motion is made. For particular applications, the throwing projectile (50) might be made in a shape other than spherical. The throwing projectile (50) could have dimples in its surface. It could be oblong or football shaped. The ultimate shape a commercial throwing projectile (50) assumes may be determined by the needs of the manufacturing process and of the marketplace. In FIG. 2A the throwing projectile (50) is shown circular in cross-section. It is believed that a spherical throwing projectile (50) can give appropriate feedback when a proper casting motion is made. There is a bore (55) cut along a diameter of the throwing projectile (50). Typically, the bore (55) will be defined by a rigid tube (57), which will be secured inside the bore (55). The tube (57) facilitates sliding the throwing projectile (50) on the ball throwing end (14) of the tube (12). At the point of placement of the tube (57), the throwing projectile (50) will have dimples (56) so that the ends of the tube (57) will be beneath a hemispherical surface of the throwing projectile (50). The soft material surrounding the tube (57) will provide some protection against impact for the tube (57) when the throwing projectile (50) is in use. However, for experienced fly fisherman who wish to use the fly cast training device (10) to sharpen their skills for a particular rod and line, the characteristics of the throwing projectile (50) can be appropriately adjusted. A spherical shaped throwing projectile (50) will be easy to manufacture and will have consistent characteristics regarding air resistance. Roughly speaking, the throwing projectile (50) can be shaped and weighted to approximate the characteristics of a particular fly line. Generally accepted standards for fly lines are established by the American Fishing Tackle Manufacturers Association. A Number 6 fly line, for example, will have a weight of 160 grains for thirty feet of fly line with approximately 8 grains of variation permitted. The Number 8 fly line (a heavier fly line) will have a weight of 210 grains with, again, 8 grains of variation permitted. The Number 10 fly line (a still heavier fly line) will have a weight of 280 grains with a variation of 10 grains permitted. Therefore, in practice, the throwing projectile (50) may be sold in different weights so that the fly casting training device (10) will approximate the weight of a length of a particular fly line. Therefore, if an experienced fisherman wishes to practice cast with a particular weight fly line, he may choose a fly casting training device (10) whose weight approximates the weight of the length of the fly line involved. Moreover, the size of the throwing projectile (50) will be determined by the aggregate wind resistance of approximately the first 30 feet of fly line. By approximating the weight and air resistance of the first 30 feet of fly line, the throwing projectile (50) will give a fisherman a general idea of the distance he would have achieved in a cast with an actual fly line. By empirical testing it is believed that, for a spherical throwing projectile (50), the projectile (50) should be between one and three inches in diameter. Different shapes for the throwing projectile (50) could change the size of the throwing projectile (50) needed to approximate the air resistance of the first 30 feet of fly line. That is, the distance the throwing projectile (50) will be thrown will approximate the distance the fly line would have been thrown had that same movement been duplicated by the fisherman in an actual fly cast. However, the fly cast training device (10) can be used with a throwing projectile (50) that does not approximate any particular fly line to give immediate feedback about the motion involved in a cast. That is to say, the fly cast training device (10) can be used to give immediate feedback about the motion in a cast whether the throwing projectile (50) approximates a particular weight fly line or not. A more experienced fly fisherman who wish to practice a particular cast for a particular fly line will be concerned about the particular weight and wind resistance of the throwing projectile (50).

FIG. 3 demonstrates the speed up and stop motion with a correct cast for a rod of a particular flexibility. The handle of the rod (100) is shown at the bottom of FIG. 3 in position (101). A hand gripping the rod (not shown) moves the rod forward in a quick punching-like motion in the direction of the arrow to the position (102) of the handle. When the rod handle is in position (101) and moving forward as shown by the arrow, the rod tip (22) lags because of the flexibility of the rod, resulting in a curvature in the rod as shown in position (51). The lagging of the rod tip (22) loads the rod. The forward momentum of the rod will hold the throwing projectile (50) in place on the fly casting training device (10). When the handle of the rod is in position (102), forward motion of the rod is stopping. Therefore, the forward momentum of the rod is being checked by the user. The handle (100) may travel a short distance further due to the difficulty of stopping the rod at once but as the handle (100) comes to a dead stop at position (102) and the forward movement of the handle of the rod is stopped by the user, the rod tip (22) will whip forward as the rod unloads. Where the rod tip (22) reaches the vertical position (52), the rod tip (22) is now slowing down as its forward motion is checked by the hand of the user on the handle (100). However, the throwing projectile (50) will continue forward with the same forward velocity initially imparted by the casting motion since it is only loosely connected by the bore (55) (not shown) on the throwing projectile (50) to the tube (12). It will begin to move forward off the device as is shown in the rod position (52). The rod tip (22) will continue forward until it is flexed forward shown in position (53). The more flexible the rod, the further flexed forward will be the tip of the rod (22). The angle (A) seen in FIG. 2 should be designed so that in a typical casting motion for a particular flex rod at position (53) the projectile throwing end (14) of the fly cast training device (10) will be pointed directly forward and parallel to the ground. This will enable the throwing projectile (50) to exit from the end of the tube (12) to be thrown forward parallel to the ground as is shown in FIG. 1B. The more flexible the rod, the more flexed forward the rod will be in position (53) and the greater the angle (A) for the fly casting training device (10) must be to allow easy exit of the throwing projectile (50) from the (12). If the rod was inflexible, then the tube (12) would be bent at a 90° angle and the angle (A) shown in FIG. 2 would be zero. The greater the flexibility of the rod, the greater the angle (A) must be to compensate for the "lag" of the rod tip due to acceleration and deceleration in the speed up and stop motion. Ordinarily, the fly cast training device (10) will be made of some flexible material which will allow some adjustment to particular flex characteristics of a rod. It is also anticipated that the fly cast training device (10) will be sold with different angles (A) for different flexibilities of rod that are sold and rated by the rod manufacturer. In a good cast, the loading and unloading of the rod, hence the bending of the rod tip (22) as shown in FIG. 3, causes the rod tip to move forward in an approximate straight line parallel to the ground. This motion of the rod tip (22) is substantially different than an arc that would be described by the rod tip (22) had the rod handle been simply tilted backward and forward as seen in FIG. 1A. It is a cast using short, punching, speed-up-and-stop motion of the rod handle (100) which causes the tip of the rod (22) to travel along an approximate straight line while the rod is loading and unloading. This approximate straight line motion of the rod tip (22) imparts a "tight" loop to the fly line with most of the momentum imparted to a forward motion of the fly line rather than a large loop in the fly line wasting much of the momentum in a vertical direction.

Because the bore (55) of the throwing projectile (50) is only slightly larger than the diameter of the tube (12) and because the throwing projectile (50) is pushed back and lodged against the stop (15), the throwing projectile (50) will not be thrown off the tube (12) and propelled forward approximately parallel to the ground and in the same direction as the casting motion unless the appropriate abrupt speed-up and stop motion is achieved by the student using the fly casting training device (10). There is approximately 2 inches of tube (12) between the stop disk (15) and the ball throwing end (14) of the tube (12). The throwing projectile (50) itself is approximately 1½ inches in diameter. This arrangement assures, if one makes the bad cast shown in FIG. 1A, that the ball will sometimes be propelled largely upward if one stops the forward motion too quickly or will be retained on the tube (12) too long and be cast—that is, thrown—toward the ground in front of the student (as shown in FIG. 1A). Only a successful quick, forward motion with an abrupt stop will succeed in throwing the throwing projectile (50) off the end of the tube (12) in the direction of the desired cast and approximately parallel to the ground.

The fly cast training device (10) will be used with a number of throwing projectiles (50). A casting motion will be made with the flight of the throwing projectile (50) observed. If the path of the throwing projectile (50) is acceptable, then the user will place another throwing projectile (50) on the tube (12) and will repeat the process. This will enable a user to quickly learn and "groove" a correct casting motion. It will be appreciated by one of skill in the art that variations are permitted in the design and construction of the embodiment described above, while not departing from the essential spirit of the invention. The above description is not limiting but is illustrative and the scope of the invention is limited only by the claims which follow.

I claim:

1. A training device to teach the proper motion for casting a fly line comprising:
   (a) a throwing projectile with a bore therethrough;
   (b) an elongated piece, said elongated piece having a first mounting section for mounting the elongated piece on a terminal end of a fly rod without removing or modifying any hardware on said fly rod and a second throwing projectile section whereby said throwing projectile slides onto said throwing projectile section through said throwing projectile bore;
   (c) means for mounting said elongated piece using said first mounting section to a terminal end of a fly rod. where by said fly rod can be used as a device to teach casting a fly line without actual use of a fly line.

2. A training device to teach the proper motion for casting a fly line of claim 1 wherein in said mounting section portion of said elongated piece said piece is bent at a predetermined angle whereby said second throwing projectile section is at said predetermined angle to a terminal end of a fly rod when said elongated piece is mounted on a terminal end of a fly rod.

3. A training device to teach the proper motion for casting a fly line of claim 2 wherein said predetermined angle is at least 90°.

4. A training device to teach the proper motion for casting a fly line of claim 3 wherein said predetermined angle is 90°+A°, A° a predetermined amount based on the stiffness of a fly rod with which said training device is to be used.

5. A training device to teach the proper motion for casting a fly line of claim 4 wherein said throwing projectile is a predetermined shape, size, and weight so as to most closely approximate casting a particular type of fly line.

6. A training device to teach the proper motion for casting a fly line of claim 5 wherein said elongated piece further includes means for stopping movement of said throwing projectile onto said throwing projectile section of said elongated piece.

7. A training device to teach the proper motion for casting a fly line of claim 6 wherein said predetermined shape of said throwing projectile is approximately spherical.

8. A training device to teach the proper motion for casting a fly line of claim 7 wherein said predetermined size of said throwing projectile is between one and three inches in diameter.

9. A training device to teach the proper motion for casting a fly line of claim 8 wherein said predetermined weight of said throwing projectile is determined by the weight of 30 feet of a predetermined type of fly line for which the throwing projectile is to be used to simulate a cast.

10. A training device to teach the proper motion for casting a fly line of claim 9 wherein said means for stopping is a collar placed around said throwing projectile section of said elongated piece.

11. A training device to teach the proper motion for casting a fly line of claim 10 wherein said elongated piece further comprises means for holding said throwing projectile in place against said means for stopping whereby said throwing projectile is held in place against a force of gravity, but said means for holding is calibrated to release said throwing projectile when said training device in use during a practice cast.

12. A training device to teach the proper motion for casting a fly line comprising:
   (a) a throwing projectile;
   (b) means for mounting said throwing projectile onto a fly rod without removing or modifying any hardware on said fly rod whereby said throwing projectile is projected forward in an approximate direction that fly line would be projected forward when an appropriate casting motion is made using a fly rod;
whereby said fly rod can be used to teach casting of a fly line without actual use of a fly line.

13. A training device to teach the proper motion for casting a fly line of claim 12 wherein said throwing projectile is of a predetermined shape, size, and weight so as to most closely approximate casting a particular type of fly line.

14. A training device to teach the proper motion for casting a fly line of claim 13 wherein said predetermined shape of said throwing projectile is approximately spherical.

15. A training device to teach the proper motion for casting a fly line of claim 14 wherein said predetermined size of said throwing projectile is between one and three inches in diameter.

16. A training device to teach the proper motion for casting a fly line of claim 15 wherein said predetermined weight of said throwing projectile is determined by the weight of 30 feet of a predetermined type of fly line for which the throwing projectile is to be used to simulate a cast.

17. A method for teaching the proper motion for casting a fly line comprising:
   (a) mounting an elongated piece on a terminal end of a fly rod without modifying or removing any hardware on said fly rod;
   (b) mounting a throwing projectile on a throwing projectile section of said elongated piece;
   (c) making a casting motion of a fly rod with said elongated piece and said throwing projectile mounted thereon and without using a fly line;
   (d) observing the results of movement of said throwing projectile;
   (e) repeating said casting motion if the trajectory of the throwing projectile is satisfactory or changing said casting motion if trajectory of said throwing projectile is unsatisfactory;
   (f) repeating said casting motion until the user is able to consistently achieve a satisfactory trajectory of said throwing projectile.

18. A method for teaching the proper motion for casting a fly line of claim 17 wherein said method further includes bending said elongated piece at an angle of at least 90°.

19. A method for teaching the proper motion for casting a fly line of claim 18 wherein said method further includes bending said elongated piece at an angle of 90°+A°, A° a predetermined amount based on the stiffness of a fly rod with which said training device is to be used.

20. A method for teaching the proper motion for casting a fly line of claim 19 wherein said method further includes making said throwing projectile approximately spherical in shape and between one and three inches in diameter.

* * * * *